United States Patent [19]
Jeffery et al.

[11] Patent Number: 5,359,806
[45] Date of Patent: * Nov. 1, 1994

[54] RECHARGEABLE TERMITE BARRIER FOR BUILDINGS

[75] Inventors: Andrew B. Jeffery, North Quincy; John Skelton, Sharon, both of Mass.

[73] Assignee: Albany International Corp., Albany, N.Y.

[ * ] Notice: The portion of the term of this patent subsequent to Jul. 6, 2010 has been disclaimed.

[21] Appl. No.: 66,530

[22] Filed: May 24, 1993

[51] Int. Cl.$^5$ .............................................. A01M 1/20
[52] U.S. Cl. ...................................................... 43/131
[58] Field of Search ...................... 43/124, 132.1, 131; 428/289, 907

[56] References Cited

U.S. PATENT DOCUMENTS

| | | |
|---|---|---|
| 2,139,225 | 12/1938 | Easling . |
| 2,315,772 | 4/1943 | Closs . |
| 2,842,892 | 7/1958 | Aldridge ................. 43/124 |
| 2,899,771 | 8/1959 | Burris, Jr. . |
| 2,952,938 | 9/1960 | Abrams . |
| 3,209,485 | 10/1965 | Griffin .................... 43/124 |
| 3,295,246 | 1/1967 | Landsman et al. . |
| 3,767,785 | 10/1973 | Bordenca . |
| 3,837,988 | 9/1974 | Hennen . |
| 3,931,692 | 1/1976 | Hermanson . |
| 4,103,450 | 8/1978 | Whitcomb . |
| 4,625,474 | 12/1986 | Peacock ................. 43/124 |
| 4,893,434 | 1/1990 | Knipp ..................... 43/124 |
| 4,976,062 | 12/1990 | Rutledge et al. . |
| 5,007,197 | 4/1991 | Barbett . |
| 5,041,103 | 8/1991 | Rupinskas . |
| 5,184,418 | 2/1993 | Fletscher ............... 43/124 |
| 5,224,288 | 7/1993 | Skelton et al. . |

FOREIGN PATENT DOCUMENTS

WO9014004 11/1990 WIPO .

Primary Examiner—P. Austin Bradley
Assistant Examiner—James Miner
Attorney, Agent, or Firm—Kane, Dalsimer, Sullivan, Kurucz, Levy, Eisele & Richard

[57] ABSTRACT

A pesticidal barrier, which may be used as a liner for a building excavation to protect the building to be constructed from infestation by termites and other insect pests, takes the form of a flexible membrane. The membrane comprises an assembly of fibers or filaments. The assembly has an average void volume of less than 85% when measured under a pressure of 10 kPa (1.45 psi). The fibers in the assembly have an average fiber size of less than 6 denier. The assembly integrally incorporates within its structure, or has above or below its structure, an array or network of connected permeable-walled tubes, so that an insecticide may be delivered to all parts of the membrane, particularly after the barrier has been installed at a building site.

14 Claims, 5 Drawing Sheets

RECHARGEABLE TERMITE BARRIER FOR BUILDINGS

BACKGROUND OF THE INVENTION

1. Field of the Invention

The present invention relates to a means for controlling the infestation of buildings by insect pests, particularly by subterranean insect pests. More particularly, the present invention is a flexible membrane disposed as a liner in an excavation prior to the construction of a building therein, and which includes an array of connected porous tubes for the delivery of insecticide to all parts of the membrane both upon initial installation and subsequently during the useful lifetime thereof.

2. Description of the Prior Art

Insect pest control devices comprising some form of bonded textile fibers coated with an insecticide are known in the art. For example, U.S. Pat. No. 4,103,450 to Whitcomb shows an insecticidal device, which uses a lofty bonded web of textile fibers as a scaffold for insecticidal materials, which may subsequently volatilize therefrom into the ambient air. The device purports to permit control over the location, distribution and dispersal of the volatile insecticide deployed therein, and may be simply discarded when the quantity of the insecticide remaining therein falls below an effective level. The device is said to have a number of advantages, particularly for household applications, because it may be deployed readily in small spaces behind appliances which may attract insects. Because the insects in question may actually crawl through the interstices between the textile fibers in the lofty assembly, thereby coming into prolonged direct physical contact with the insecticide being used, the Whitcomb device is highly efficient in its use of the insecticide.

The emphasis in the Whitcomb patent is on a lofty, resilient, highly porous structure which provides an effective, but temporary, means of controlling domestic insect pests in the interior of a house. However, the solution to problems encountered in exterior, or outdoor, insect control requires a totally different approach. For example, in many parts of the world, termites are endemic, and, as cellulose forms their principal food material, they can cause a great deal of damage to wooden structures. Typically, termite colonies build nests underground in the soil near ground level, in a stump or other source of timber, or in the trunk of a living tree. Colonies may persist for years and may attain populations running into millions of individuals.

Termite attacks originate from the nest. Timber lying on or buried, partially or completely, in the ground may be reached by underground foraging galleries. Attacks may also be carried out well above the ground surface via access passages constructed by the termites from mud or earth on a concrete or brick building foundation.

Both a building and its contents may be provided with significant protection by means of a chemical soil barrier which prevents the attacking termites from reaching wooden structural members. The conventional practice is to treat the soil surrounding a building foundation and footing with any one of a number of well-known chemicals. Chemicals such as aldrin, chlordane, dieldrin and heptachlor may be sprayed on the soil surface by low pressure spray equipment. Alternatively, vertical chemical barriers may be installed by excavating trenches, by treating the exposed trench and by refilling the trench with treated soil, or by rod injection.

In addition to spraying soil with toxic chemicals, other practitioners in the field have proposed insecticidal barriers, including barriers against termites for use around building structures. For example, U.S. Pat. No. 2,899,771 discloses a flexible vapor barrier carrying a layer of water-emulsifiable insecticide. The insecticide in question is carried in a flexible, relatively thin, water-soluble substance, such as "Polyox". U.S. Pat. No. 2,139,225 shows a paper which is coated with arsenate of lead mixed into a paint, whose base is mineral pitch or asphalt. A felt paper in sheet form is impregnated with the mixture by application to one or both surfaces thereof. After the paper has dried, it is packaged and thereafter may be used whenever desired in the same manner as ordinary felt paper, i.e., it can be laid under floors, or placed between foundations and superstructures, or between the walls of buildings and roofs.

An interesting alternative approach to the provision of an effective termite barrier for new construction is described in International Patent Publication No. WO 90/14004. This publication describes a method of preventing termite damage by providing at the building site a flexible, untreated blanket which is used, for example, to line a building excavation, and then is impregnated with a suitable insecticide. The new construction is then built over the impregnated blanket. The fiber assembly is not described in great detail in this publication. In particular, International Patent Publication No. WO 90/14004 teaches nothing about the fiber density of the fiber assembly, or about its void volume.

SUMMARY OF THE INVENTION

The present invention is a means for controlling the infestation of buildings by subterranean insect pests. More specifically, the present invention is a flexible membrane made up of an assembly of fibers or filaments which incorporates integrally within its structure, or which has adjacent to its structure, at least one permeable-walled tube for the delivery of insecticide to all parts of the membrane and which allows for charging and recharging of the interstices of the membrane from time to time with insecticide.

The flexible membrane offers the advantages of ready conformability to uneven surfaces at a building site and of simplicity of installation. The incorporation of a liquid delivery system into or on the device permits both the initial charging and any recharging dosage of active insecticidal ingredient to be accurately tailored to the activity and numbers of insect pests, and, consequently, reduces the potential hazard to the environment presented by the insecticide. That the membrane may be recharged with insecticide ensures its long-term effectiveness. In fact, its performance may even be upgraded, since improved insecticides arriving on the market may be introduced into the membrane using the delivery system. In addition, that the membrane may be periodically recharged with insecticide permits the use of agents of lower toxicity, which may indeed be biodegradable and of less potential long-term danger to the environment.

The flexible membrane may be made from staple fiber or continuous filaments, and may be nonwoven, woven or of some other textile construction. The fibers are preferably of synthetic, polymeric material, but ceramic or metallic fibers may be used in particularly demanding circumstances. The permeable-walled tubes are also preferably of synthetic, polymeric material, although they may be made of other suitable materials so long as they remain of sufficient flexibility. The permeable-walled tubes may include pores in their walls of sufficient size and in sufficient number to permit the delivery of the required amount of insecticide to the fibrous membrane, or, alternatively, the tubes may be made of a non-porous, permeable synthetic, polymeric material.

Various manifolding and connecting systems may be used to connect the tubes together to permit efficient delivery of sufficient quantities of the insecticide to all parts of the membrane.

In an embodiment of the present invention, a network of permeable-walled tubes is sandwiched between two fibrous batt layers, which layers are subsequently consolidated by hydroentanglement. This leaves the network of permeable-walled tubes firmly captured within the structure of the fibrous assembly. Alternatively, the network may lie above or below the fibrous batt layer on an upper or lower surface thereof.

Preferably, the assembly of fibers or filaments having the network of permeable-walled tubes has an average void volume of less than 85% when measured under a pressure of 10 kPa (1.45 psi), and the average fiber size is smaller than 6 denier. The fiber surfaces in the assembly are coated with an insecticidal substance, once the flexible membrane has been deployed in an excavation or the like at a construction site prior to the construction of a building therein, or, after the building has been constructed, through the medium of the network of permeable-walled tubes, and serves as a highly effective barrier against the depredations of subterranean insect pests, particularly termites.

The fiber assembly may be made up of a web of staple fibers or of continuous filaments. It may be spun-bonded or melt-blown, and may be consolidated into the above-noted working density range (average void volume less than 85%) by needling, hydroentangling or simple calendering. Preferably, the fibers are of a synthetic polymeric resin, but, as mentioned above, ceramic or metallic fibers may be used to satisfy especially demanding environmental conditions. Assemblies of mixed fiber types are also embraced within the scope of the present invention in order to permit management of web properties and to control the ultimate price.

The present invention will now be described in more complete detail with frequent reference being made to the figures identified below.

DETAILED DESCRIPTION OF THE PREFERRED EMBODIMENT

The invention described in International Patent Publication No. WO 90/14004 is said to include a blanket which may be of any material capable of absorbing liquid pesticide or pest repellant, and which is sufficiently durable to remain intact in situ for the life of the building or article to be protected. The blanket may be made of any of a number of absorbent materials of a generally fibrous nature, and should be rot-resistant.

However, subsequent research into the issues that must be considered in the production of an optimally functional, durable, and economically producible fiber assembly has indicated that a workable foraminous, fibrous membrane is characterized by a narrow and specific set of design parameters. Such a membrane is the subject of the present invention.

Figure 1:
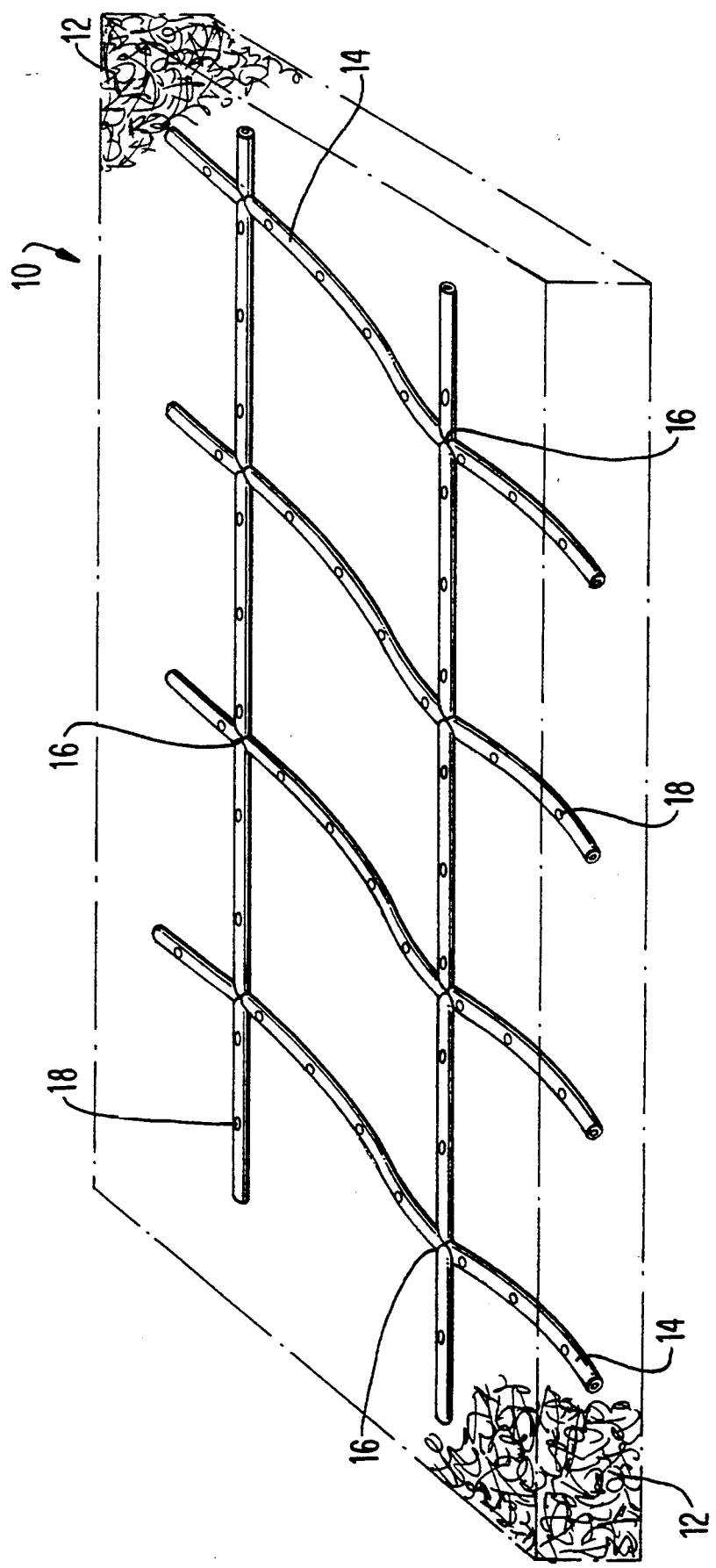
FIG. 1 is a plan view of a flexible membrane of the present invention.

FIG. 1 is a plan view of a portion of the flexible membrane 10 of the present invention. The membrane 10 comprises an assembly of fibers or filaments 12 consolidated by needling, hydroentangling or simple calendering.

Incorporated within the structure of the membrane 10, or disposed either above or below the structure of the membrane 10, is an array of connected permeable-walled tubes 14. The tubes 14 may be connected to one another to form a network thereof, as shown in FIG. 1, by being suitably joined at points 16. The tubes 14 permit an insecticide to be delivered to all parts of the membrane 10, particularly when the membrane 10 requires recharging with an insecticide after its initial charging thereof has been depleted or has lost its efficacy. Pores 18 allow the insecticide flowing through tubes 14 to seep out and permeate through the fibers or filaments 12 of the membrane 10.

The tubes 14 may be of a synthetic polymeric resin, such as nylon or polyethylene, and may have an inside diameter from 3.0 mm to 6.0 mm. The pores 18 may have diameters on the order of 1.0 mm, although the tubes 14 themselves may be made of a permeable material, in which case there would be no pores 18. Where pores 18 are included, they may be separated anywhere from 50.0 mm to 100.0 mm apart along the lengths of the tubes 14.

Figure 2:
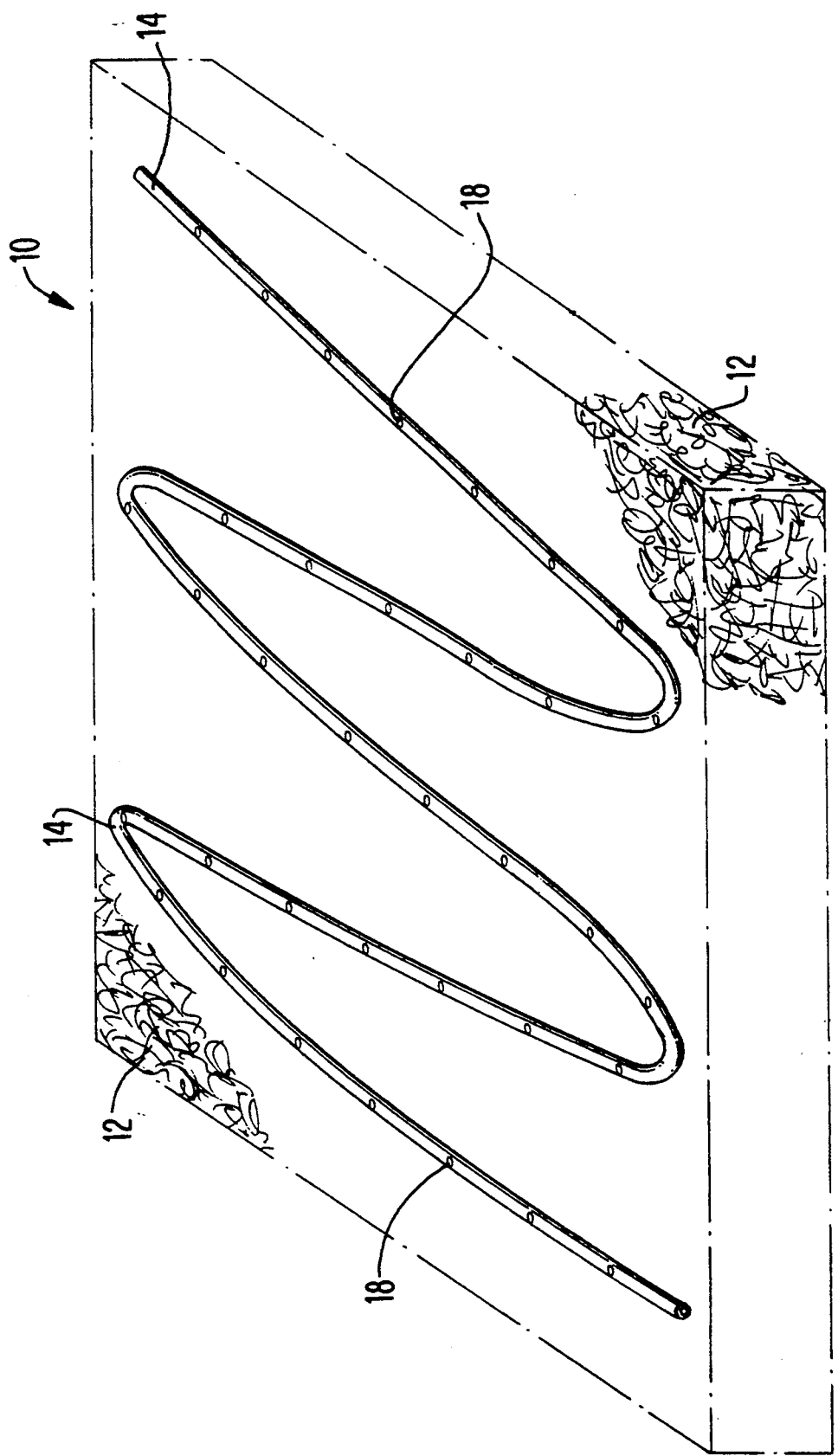
FIG. 2 is a plan view of an alternate embodiment of the flexible membrane of the present invention.
Figure 3:
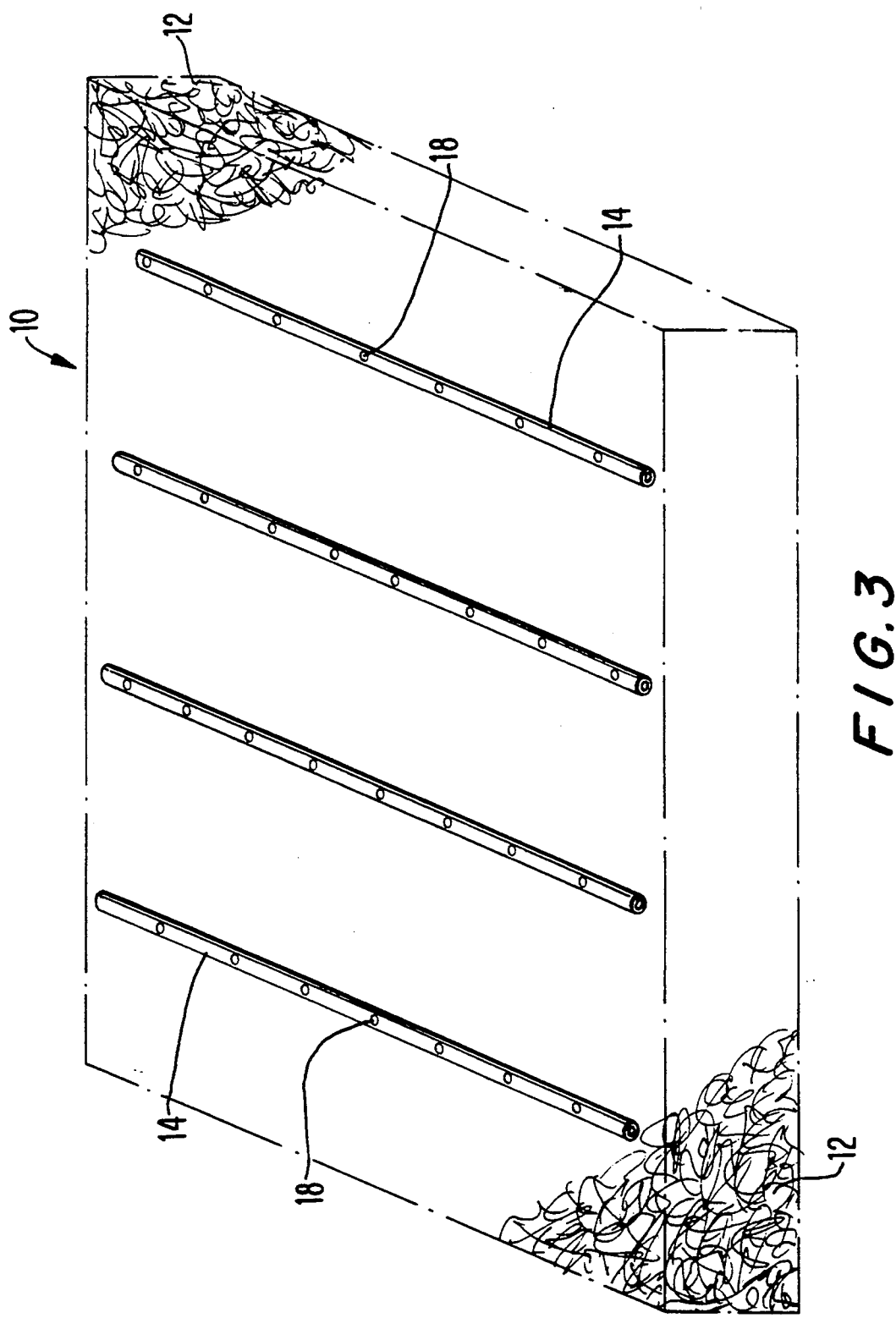
FIG. 3 is a plan view of yet another embodiment of the flexible membrane of the present invention.

The tubes 14 may be connected to one another to form a grid-like pattern, as shown in FIG. 1, where the tubes 14 are joined at points 16 by suitable interconnecting members. Alternatively, a length of tube 14 may wind in snake-like fashion through, on, or under the foraminous, fibrous membrane 10, as shown in FIG. 2, or lengths of tube 14 may run transversely across the membrane 10, either through, on or under its structure, in the manner of a ladder, as shown in FIG. 3.

Some of the specific issues that arise in the design of an optimal membrane structure will now be discussed.

The principle structural parameters that affect the mechanical properties of a fiber assembly are the fiber diameter and the assembly density. It is customary to express the size of textile fibers and filaments in terms of denier, which is defined as the weight, in grams, of 9000 meters of the fiber. The relationship between the denier, D, and the diameter, d, in centimeters, for a fiber with a density $p_f$ gms/cc is:

$$D = (\pi d^2 \times 9 \times 10^5 \times p_f)/4$$

The assembly density is expressed as fiber volume fraction $v_f$ or as its related complement percentage void volume, $V_v$. These parameters are related through the expression:

$$v_f = 1 - (V_v/100)$$

It is often revealing and informative to examine the performance requirements of fiber assemblies in terms of a mapping of these two parameters. Since the fiber denier can vary over several orders of magnitude, while the volume fraction is constrained to be within the range $0 < v_f < 1$, it is best to plot this map in a semi-logarithmic manner, with the axis representing fiber denier being logarithmic and the axis representing assembly fiber volume fraction being linear. A typical plot of this type is shown in FIG. 2. The shaded area in the plot represents the parameters of the fiber assemblies of the present invention, that is, average fiber size smaller than 6 denier and average void volume less that 85%.

The surface area of fiber per unit of assembly volume is of direct importance since it will determine the amount of insecticidal material that can be incorporated into the assembly. If the insecticidal material is deposited from solution or suspension to form a coating on some or all of the fiber surfaces, then the larger the assembly fiber surface area the more active ingredient can be deployed. In a device designed for temporary or short term use there is no particular virtue in incorporating sufficient insecticidal material to ensure longevity, but where a permanent barrier is required, as in the present membrane material, there is a strong motivation to increase the surface area of the assembly as much as is practical. The surface area/unit volume of assembly, A, is given by:

$$A = 3.36 \times 10^3 v_f (\rho_f/D)^{\frac{1}{2}}$$

Figure 4:
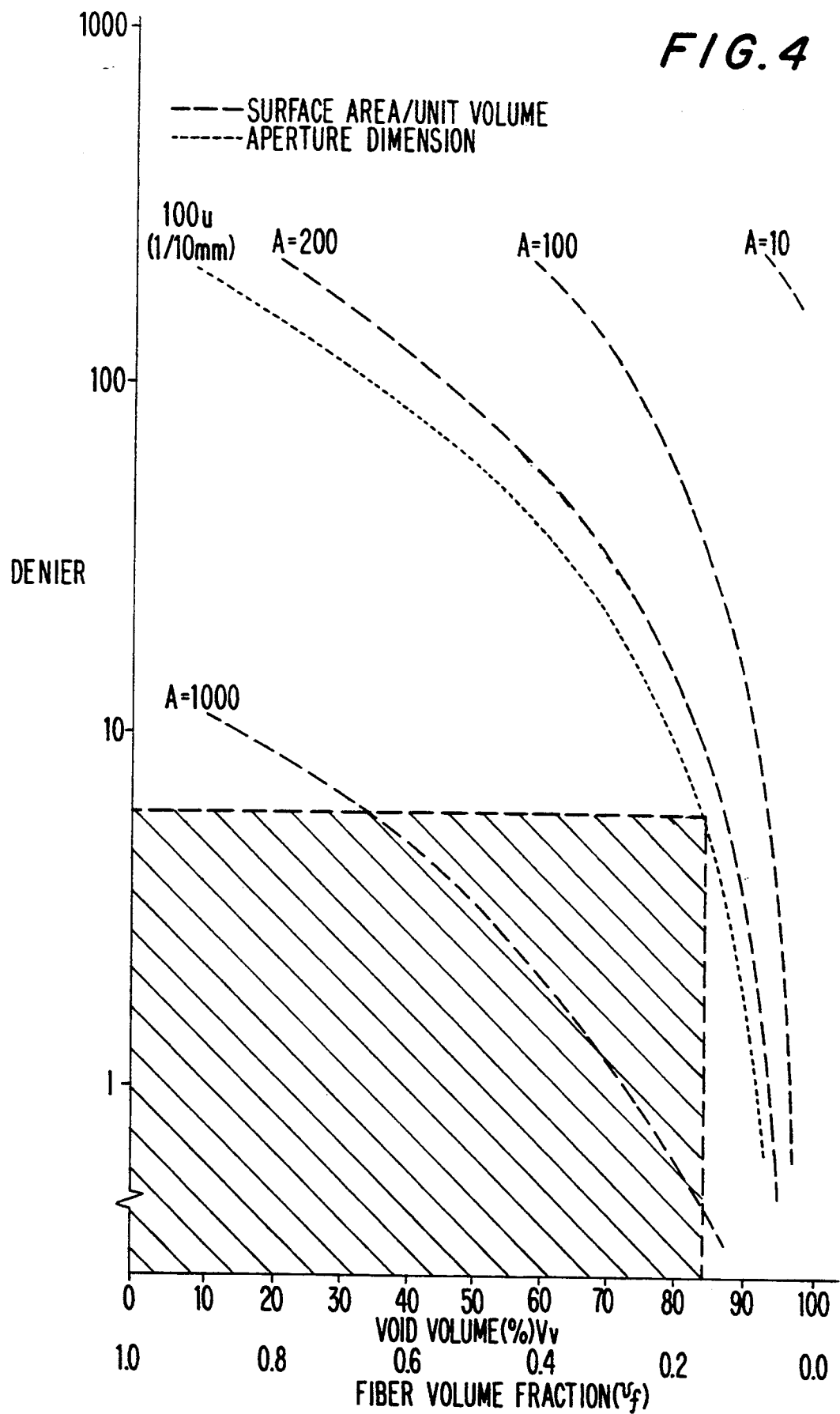
FIG. 4 is a semi-log plot of fiber denier against void volume for the fiber assembly included in the present invention.

In FIG. 4, a family of curves indicating those assemblies having certain constant values of surface area have been plotted. The density, $\rho_f$, assumed in the plotting of these curves is that which would characterize an assembly of fibers of which 25% were nylon and 75% were polypropylene. It is immediately apparent that large surface area assemblies are found in the lower left hand portion of the plot. Note that these lines are for assemblies of constant area per given volume of assembly. Where one desires to maximize the available area for a given weight of fiber, in order to optimize the economics of the textile component of the product, one must move to the right along the lines of constant area.

The second parameter that we have plotted is the average aperture dimension. It can be shown that the average distance L between crossing elements in a random assembly of fibers is given by:

$$L = 6.23(D^{\frac{1}{2}}/v_f) \text{ micrometer,}$$

and the dotted line in the figure represents the family of assemblies having a constant value of 100 micrometers for this parameter, which is related closely to the average aperture dimension. As may be seen, the line for 100 micrometer sized apertures (1/10 mm) curves through the center of the plot, and grazes the upper right hand corner of the rectangular area specified by the present invention. Any assembly lying above this line will have average apertures greater than this size, which is commensurate with the size of very small insect pests. The pesticidal blanket of the present invention, in contrast, is specifically designed to offer resistance to penetration by insects, and the maximum aperture size limit of just above 1/10 mm (100 μ), which is set by the conditions in the upper right hand corner of the area defined by the current specification, guarantees such resistance, since the termites are considerably larger than such a maximum aperture.

The mean aperture size has a profound influence on another important characteristic of the assembly, particularly if it is employed in the mode described in International Patent Publication No. WO 90/14004. There, the blanket is dry when it is deployed and is subsequently saturated with insecticidal solution or suspension. In order to avoid the immediate depletion of the saturated blanket by capillary transport to the adjacent soil layers, it is necessary to ensure that a considerable fraction of the interstices of the blanket are smaller than those of the soil, and this can best be achieved by utilizing fine fibers in a dense assembly - that is, by moving down toward the lower left hand quadrant of the figure. It is also a matter of experience that such assemblies will show a beneficial combination of conformability and damage resistance, which will lead in turn to satisfactory performance on a building site.

Figure 5:
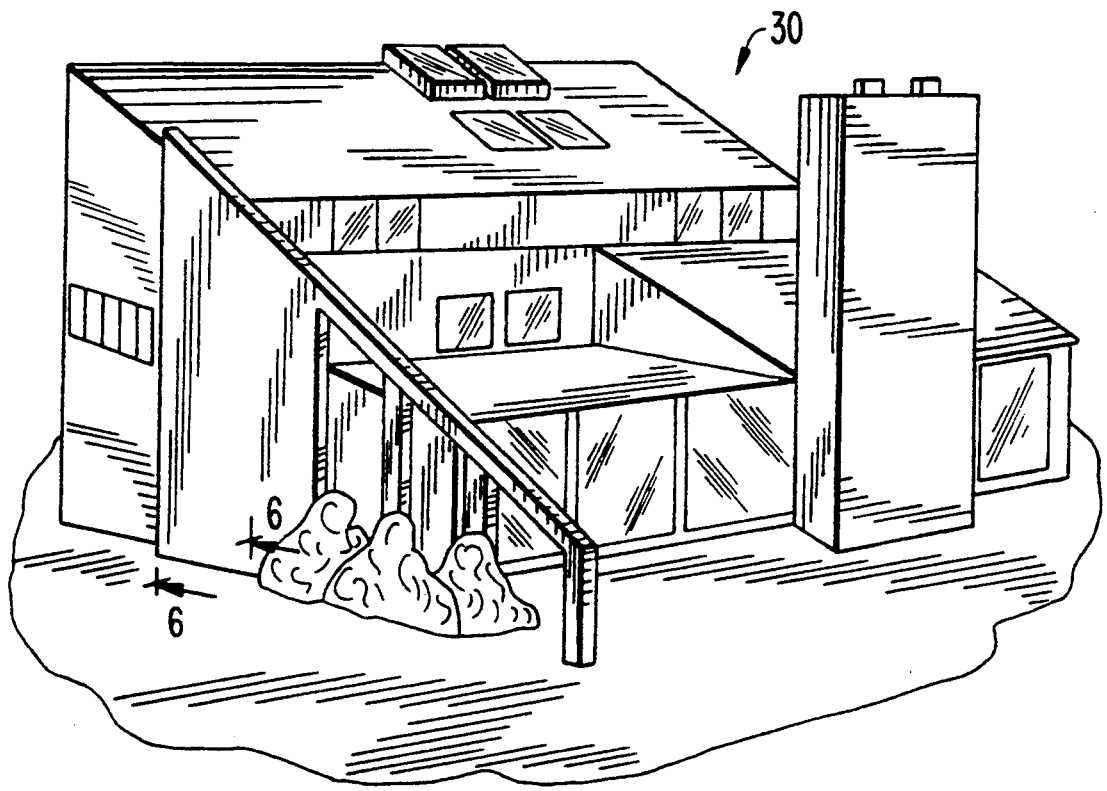
FIG. 5 is a perspective view of a building beneath which the present invention may be used.
Figure 6:
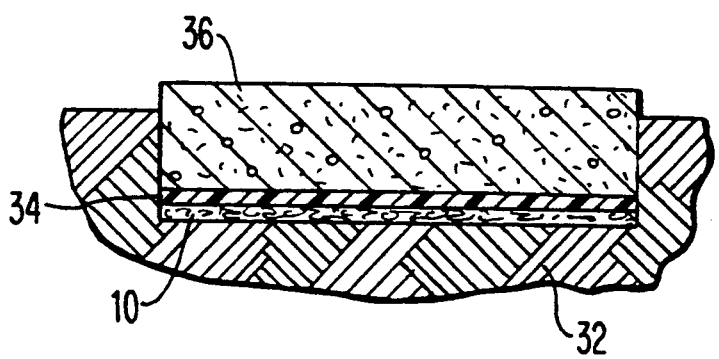
FIG. 6 is a sectional view showing the flexible membrane of the present invention in its ultimate position of use beneath a building to be protected from subterranean insect pests.

FIG. 5 is a perspective view of a building 30 beneath which the present invention may be used. FIG. 6 is a sectional view showing the flexible membrane 10 of the present invention in its ultimate position of use beneath a building 30 to be protected from subterranean insect pests. The assembly 10 is installed in an excavation prior to the construction of a building 30 therein. In FIG. 6, the assembly 10 is placed on the soil 32 in the excavation. A sheet of plastic 34 is then placed atop the assembly 10, and a concrete foundation slab 36 poured thereon. The building 30 is then constructed on the slab 36.

Modifications to the above would be obvious to those skilled in the art, and would not bring the device so modified beyond the scope of the appended claims.

What is claimed is:

1. A flexible membrane for permanent burial in the soil at a building site as a barrier against termites and other subterranean pests, said membrane comprising an assembly of interconnected fibers, said fibers having an average size smaller than 6 denier, and said assembly having an average void volume of less than 85% when measured under a pressure of 10 kPa (1.45 psi), and at least one permeable-walled tube contiguous with said assembly, said tube being permeable-walled to permit a liquid within to pass therethrough, so that said at least one permeable-walled tube may convey an insecticide throughout said flexible membrane while said flexible membrane is in situ at a building site.

2. A flexible membrane as claimed in claim 1 wherein the average distance between fiber crossing points within said assembly is less than 100 microns (0.1 mm), whereby said termites and other subterranean pests are prevented from entering therein.

3. A flexible membrane as claimed in claim 1 wherein said assembly comprises fibers of a synthetic, polymeric resin.

4. A flexible membrane as claimed in claim 1 wherein said assembly comprises ceramic fibers.

5. A flexible membrane as claimed in claim 1 wherein said assembly comprises metallic fibers.

6. A flexible membrane as claimed in claim 1 wherein said at least one permeable-walled tube is of a synthetic, polymeric resin.

7. A flexible membrane as claimed in claim 1 wherein said at least one permeable-walled tube extends transversely across said assembly of interconnected fibers.

8. A flexible membrane as claimed in claim 1 wherein said at least one permeable-walled tube extends transversely across and longitudinally along said assembly of interconnected fibers in snake-like fashion.

9. A flexible membrane as claimed in claim 1 wherein said at least one permeable-walled tube is a network of permeable-walled tubes, wherein individual tubes in said network are connected to other tubes therein.

10. A flexible membrane as claimed in claim 1 wherein said at least one permeable-walled tube extends within said assembly of interconnected fibers.

11. A flexible membrane as claimed in claim 1 wherein said at least one permeable-walled tube extends above said assembly of interconnected fibers.

12. A flexible membrane as claimed in claim 1 wherein said at least one permeable-walled tube extends below said assembly of interconnected fibers.

13. A flexible membrane as claimed in claim 1 wherein said at least one permeable-walled tube includes a plurality of pores, said pores making the walls of said at least one permeable-walled tube permeable and being provided at preselected intervals along said at least one permeable-walled tube.

14. A flexible membrane as claimed in claim 1 wherein said at least one permeable-walled tube is made of a non-porous, permeable synthetic, polymeric resin.

* * * * *